Oct. 25, 1938.   C. SAUZEDDE   2,134,007

REAR AXLE WHEEL AND BRAKE ASSEMBLY

Filed April 29, 1936   4 Sheets-Sheet 1

INVENTOR
Claude Sauzedde,
BY
ATTORNEYS

Oct. 25, 1938.　　　C. SAUZEDDE　　　2,134,007
REAR AXLE WHEEL AND BRAKE ASSEMBLY
Filed April 29, 1936　　4 Sheets-Sheet 3

INVENTOR
Claude Sauzedde,
BY
ATTORNEYS

Patented Oct. 25, 1938

2,134,007

UNITED STATES PATENT OFFICE 2,134,007

REAR AXLE WHEEL AND BRAKE ASSEMBLY

Claude Sauzedde, Detroit, Mich., assignor to Detroit Hydrostatic Brake Corporation, Detroit, Mich., a corporation of Michigan Application April 29, 1936, Serial No. 76,938

13 Claims. (Cl. 188—152)

The present invention relates to a vehicle wheel construction and the means for mounting the same upon a live axle and for supporting a brake mechanism therein for engagement with brake surfaces formed in the hub of the wheel.

The primary object of the present invention is to provide a wheel and brake assembly for automotive vehicles including means for supporting a brake mechanism within the hub of the wheel for engagement with brake surfaces formed as an integral part of the hub, the brake supporting means being rigidly attached to the axle housing so that it assumes part of the load of the vehicle and the wheel being attached to a live axle so that the latter also assumes a part of the load of the vehicle. To accomplish this object the wheel hub is formed of two sections having oblique braking surfaces rigidly secured together at their peripheries, the outer section being mounted upon the end of a live axle and the inner section being supported by anti-friction bearings on an element carried by the axle housing for supporting a brake mechanism between the two sections for engagement with the oblique braking surface therein.

Another object of the present invention is to provide means for supporting a hydraulic brake mechanism in combination with a vehicle wheel mounted upon a semi-floating or three-quarter floating rear axle assembly and more particularly a wheel wherein the hub constitutes the brake drum. In other words the invention aims to provide for the combination of a wheel structure having a hub formed with internal oblique braking surfaces into a semi-floating or three-quarter floating rear axle assembly and to accomplish this object provides a novel spider arrangement for supporting a brake mechanism within the hub so that the shoes of the mechanism move radially with respect to the hub, the spider being provided with means for conveying fluid pressure from an external source to the brake actuating mechanism for the purpose of forcing the shoes of the brake mechanism into engagement with the braking surfaces on the drum, and in addition, to provide a spider so constructed and arranged that it assumes a part of the load of the vehicle. The spider is rigidly supported by the axle housing so that the live axle within the housing may extend therethrough and the wheel structure which is formed of two sections has its outer section secured directly to the live axle within the spider while the inner section is supported by the spider by means of anti-friction bearings.

With the above and other ends in view the invention is more fully disclosed with reference to the accompanying drawings in which, Figure 1 is a vertical section;

Like characters of reference are employed throughout to designate corresponding parts.

Figure 1:
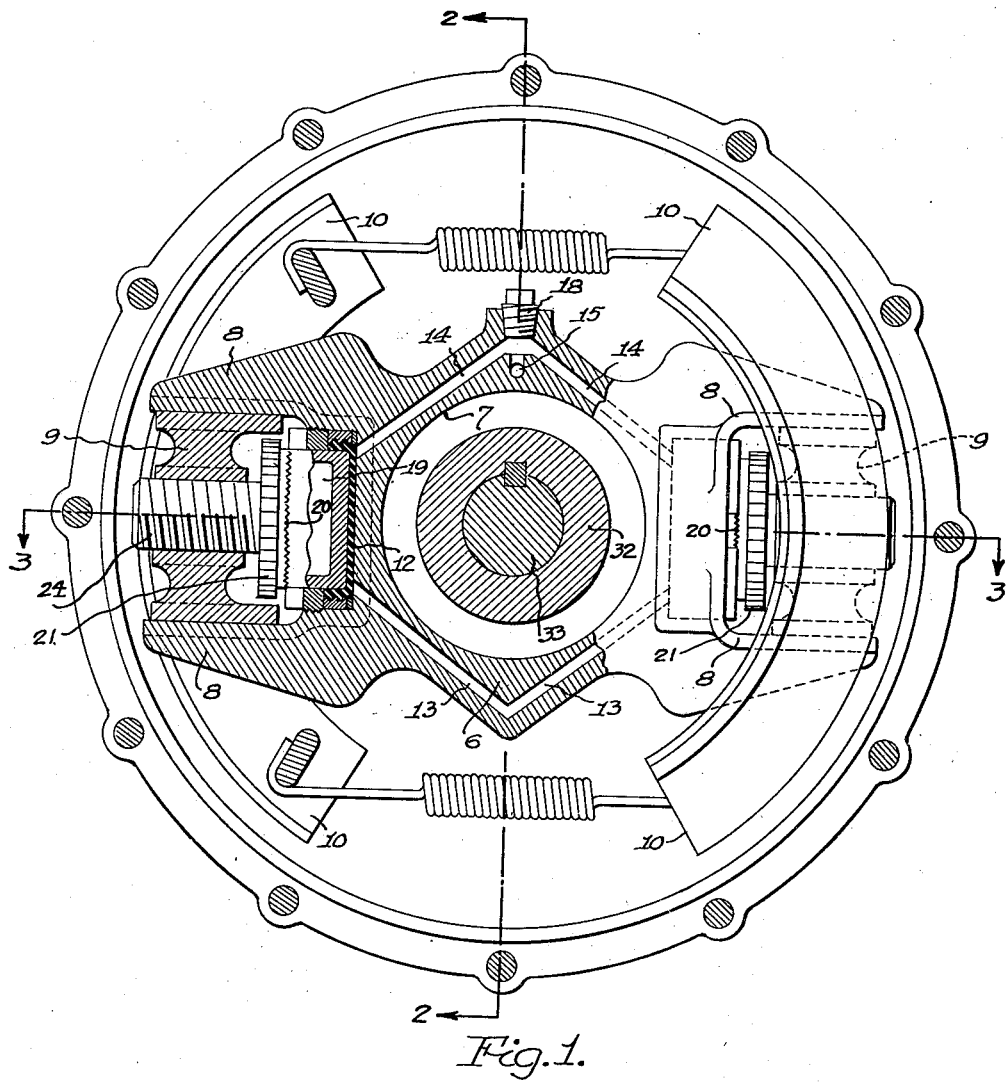

The numeral 1 designates an axle housing having an end flange 2 and bearings 3 located in the end thereof and supporting a live axle 4. Removably attached to the flange 2 by means of bolts 5 is a spider 6 having a central opening 7 extending therethrough. The spider is shown in the drawings as being formed in two parts and the means for securing these parts together has not been illustrated. It will be understood that in the assembly shown the two parts are secured together. The two part construction is for assembly purposes only and for the purposes of the present invention may be considered, after assembly, as a single unit. The spider 6 is provided with two diametrically opposed radially extending sets of guides 8 slidably receiving the supports 9 for brake shoes 10. The brake shoes 10 are formed with obliquely disposed braking surfaces 11 for cooperation with the oblique braking surfaces in the brake drum as will be hereinafter described. Adjacent each set of guides 8 is formed a fluid pressure chamber 12, the two pressure chambers thus provided being connected together by passages 13 and being connected by passages 14 to a fluid conveying channel 15 which extends in the direction of the axle housing 1. The spider 7 has a radially extending passage 16 communicating with means 17 for connecting the same with a fluid pressure system. The spider 7 is provided with a plug 18 which may be removed for the purpose of permitting air to exhaust from the chambers 12, passages 13 and 14 when such fluid receiving parts are initially filled with liquid.

In each pressure chamber 12 is provided a piston 19 which radially extending corrugations 20 in its outer face. Loosely resting upon the corrugated face 20 of the piston 19 is a rotatable member 21 having a square opening 22 therein receiving the square end 23 of a screw 24. The screw 24 is in screwthreaded engagement with the support 9 of its respective brake shoe. By rotating the rotatable element 21 by means of a suitable tool rotative movement may be imparted to the screw 24 to move the shoe radially outwardly or inwardly. The square opening 22 is made larger than the square end 23 on the screw 24 so that the shoe support 9 may move laterally with respect to the piston 19. This lateral movement of the shoe is important as will hereinafter appear for the purpose of permitting the obliquely surfaced shoes to line themselves with oblique braking surfaces.

The hub of the present wheel is formed of inner and outer sections generally designated 25 and 26 respectively, each section having an oblique wall 27 whose inner surface constitutes a braking surface. The two sections 25 and 26 are secured together at their peripheries by bolts 28. The inner section 25 has an axial formation 29 receiving anti-friction bearings 30 carried by the portion 31 of the spider 7. The bearings 30 are preferably of the needle bearing type so that they have no tendency to prevent movement as a result of end thrust which might be present in the device. The outer surface 26 has an axial formation 32 adapted to fit the tapered end 33 of the drive axle 4. The formation 32 is held against rotation with respect to the axle 4 by a key 34 and is secured upon the axle by a nut 35. A tire supporting wheel 36 is secured to the outer section 26 by means of bolts 37.

From the foregoing it becomes apparent that the spider 7 in supporting the hub section 25 through means of the bearing 30 will assume a part of the load of the vehicle and the section 26 in being mounted directly upon the live axle 4 provides for the carrying of a part of the vehicle load by the axle 4. Due to the fact that the bearings 30 are of the needle bearing type they permit the hub structure to move axially with respect to the spider 7 so that the hub structure may find its proper position with respect to the axle 4, the axle 4 in such a construction being required to take care of all end thrusts. The means 17 for connecting the brake mechanism carried by the spider to a fluid pressure system is disposed externally of the hub and is entirely carried by the spider so that no special formation in the axle housing is required to accommodate the present brake and wheel.

Figure 4:
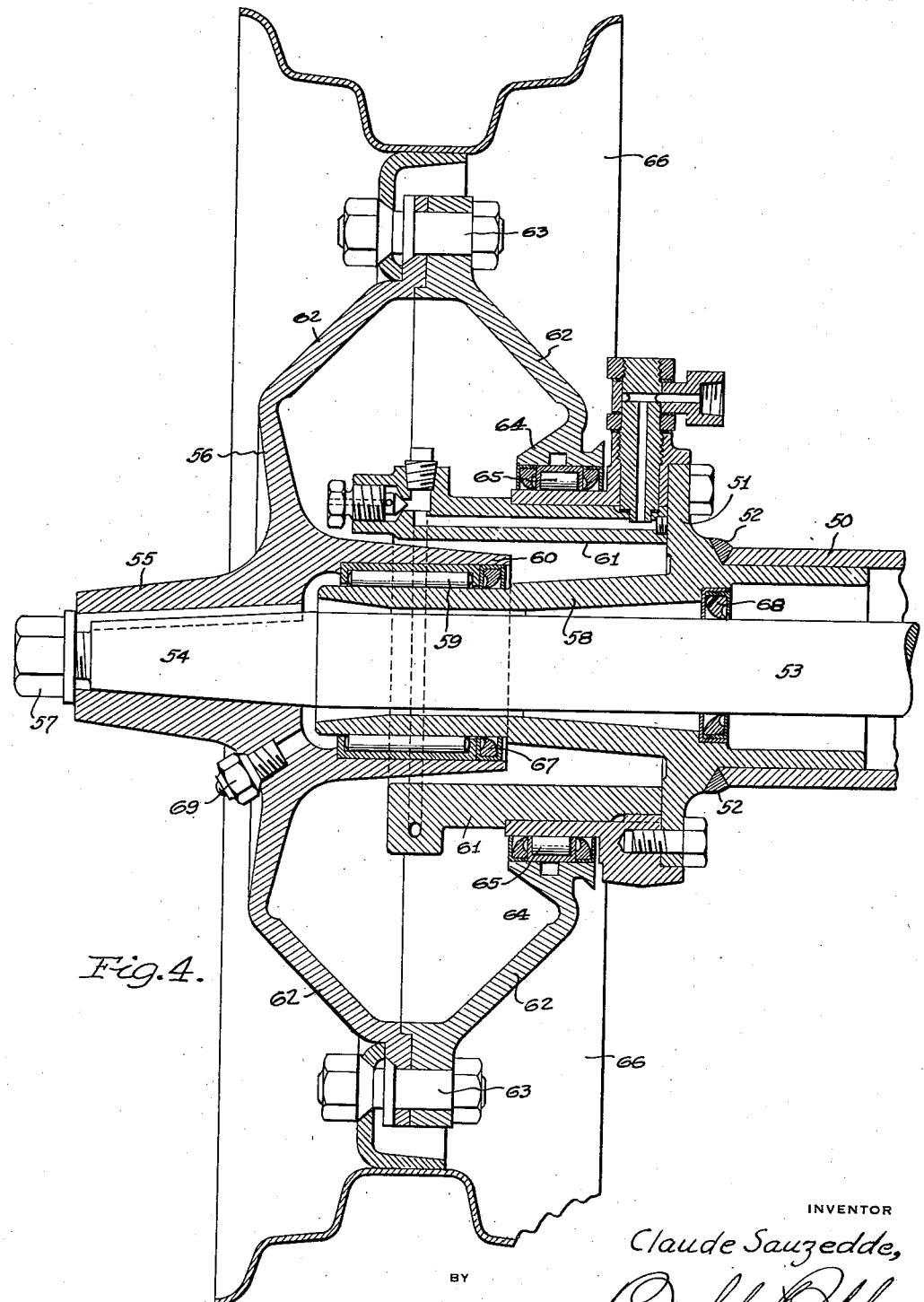
Fig. 4 is a section illustrating a modified support.

Referring to Fig. 4 there is illustrated a modified rear axle assembly including an axle housing 50 having an end flange 51 secured to the end thereof by welding as indicated at 52. Within the axle housing 50 is a live axle 53 having a tapered end 54 keyed to the axial formation 55 of the outer section 56 of a wheel hub formation. The formation 55 is held upon the tapered end 54 of the axle 53 by means of a nut 57. The flange 51 is provided with an axial projection 58 carrying needle bearings 59 which support an inwardly extending axial formation 60 of the outer section 56.

Secured to the flange 51 is a spider 61 formed of two united parts and adapted to carry a brake mechanism in the manner above described. The inner section 62 of the hub formation is secured at its periphery to the periphery of the outer section 56 by bolts 63 and has an axial formation 64 receiving needle bearings 65 which engage the spider 61. At the periphery of the sections 56 and 62 is secured a tire supporting formation 66.

In this last described formation the outer section is rotatably supported upon the extension 58 which is integral with the flange 51 and the load of the vehicle is transmitted to the outer section 56 through the axle housing 50 rather than through the live axle 53. The inner section 62 is rotatably supported upon the spider 61 carried by the axle flange 51 and therefore the entire weight of the vehicle is transmitted to the wheel through the axle housing 50. The bearings 59 and 65 are both of the needle bearing type and are not therefore capable of taking care of end thrust, and therefore permit the hub formation to find its proper position with respect to the tapered end 54 of the axle when the nut 57 is tightened into place. No stresses and strains can result from any inaccuracies in manufacture because the bearings supporting the wheels permit the wheel formation to shift axially without setting up any pressure conditions in the live axle.

This form of wheel may also be lubricated conveniently without the lubricant contacting with the braking mechanism contained therein. Inasmuch as lubricant seals 67 may be placed in the end of the axial formation 60 and lubricant seals 68 in the end of the axle housing 50 lubricant may be inserted into the axial formation 60 through a lubricating fitting 69. The seal 68 prevents lubricant from the differential housing passing through the axle housing 50 to enter the brake drum.

An important factor from the standpoint of safety resulting from the present structure is that in the event the live axle breaks, the wheel will be held in place by the spider inasmuch as the brake mechanism prevents the wheel from slipping off the spider. This is an advantage over conventional wheel and brake mountings now existing in that in such conventional structures, that is, semi-floating and three-quarter floating axle assemblies, the wheel may fall away from the axle housing when the drive axle breaks inasmuch as the drive axle is required to take care of the end thrust in the wheels.

The present invention is a development of the general type of brake mechanism assemblages disclosed in a number of patent disclosures and prior applications, of which the patent granted to me July 22, 1935, No. 2,008,728, may be considered as representative of the general type, and in which a plurality of braking units are located within an enclosed hub zone of the wheel to be braked, each unit presenting a pair of brake shoe faces adapted to be moved radially into contact with a pair of braking surfaces carried by the hub zone, the unit movement in setting the brakes being provided by fluid pressure exerted from a remote source. Various developments have been made in the general system thus disclosed, these being designed to meet particular conditions—as indicated by other patents and applications—and the present invention purposes to meet other conditions, some of which are indicated above.

During the years there have been varied changes made in the mounting of the wheels of automotive vehicles, developments such as semi-floating or of three-quarter floating rear axle assemblages being illustrative of some of these changes. Since changes such as these involve changed conditions within the hub zones of the wheels, it becomes necessary to provide changes in structure to enable the general system referred to to be applied under the changed hub zone conditions. The present invention is designed to meet changes in this direction, and to provide for improved manufacturing and assembling conditions, as well as to bring to this changed type of wheel mounting the advantages of the general system for braking operations.

Wheel mountings of the semi-floating or three-quarter floating type present certain conditions that are individual to the type. For instance, the end thrust which may be set up in service is taken care of by the axle alone instead of being distributed between the axle and axle housing or by the latter housing alone; this change tends to permit the assembly to be produced under better manufacturing conditions, since the extreme accuracy that is otherwise essential is not required, it being possible for the wheel to float relative to the axle housing within limits and thus be properly secured relative to the axle where the latter does not have the extreme accuracy condition that would otherwise be required. By utilizing a tapered end zone for the axle, the wheel can be readily shifted to its proper position and secured in such position due to the floating characteristic that is present. As a result, the manufacturer is permitted greater freedom as to variable limits in manufacture.

With braking mechanism of conventional types other than those of the present type, this freedom of the wheel to float is not materially detrimental, since the drum is generally so arranged that the shoe mechanism is operative therewith in any of the positions of the wheel. But such arrangement has the disadvantage that in case of breakage of the axle, the wheel is free to be thrown from the vehicle during service, thus endangering life. With the present type the latter possibility is prevented, since the braking units are carried by the axle housing—through the spider connection therewith, and since the units are located within the wheel itself and are arranged to engage the braking surfaces on opposite sides of a plane perpendicular to the axis of wheel rotation, the units serve to prevent movement of the wheel from the vehicle, wheel movement being limited to the allowable floating range produced by the mounting of the unit elements; hence, a broken axle will still retain the wheel as a supporting member for the vehicle to prevent collapse of the latter with its inherent danger.

Figure 2:
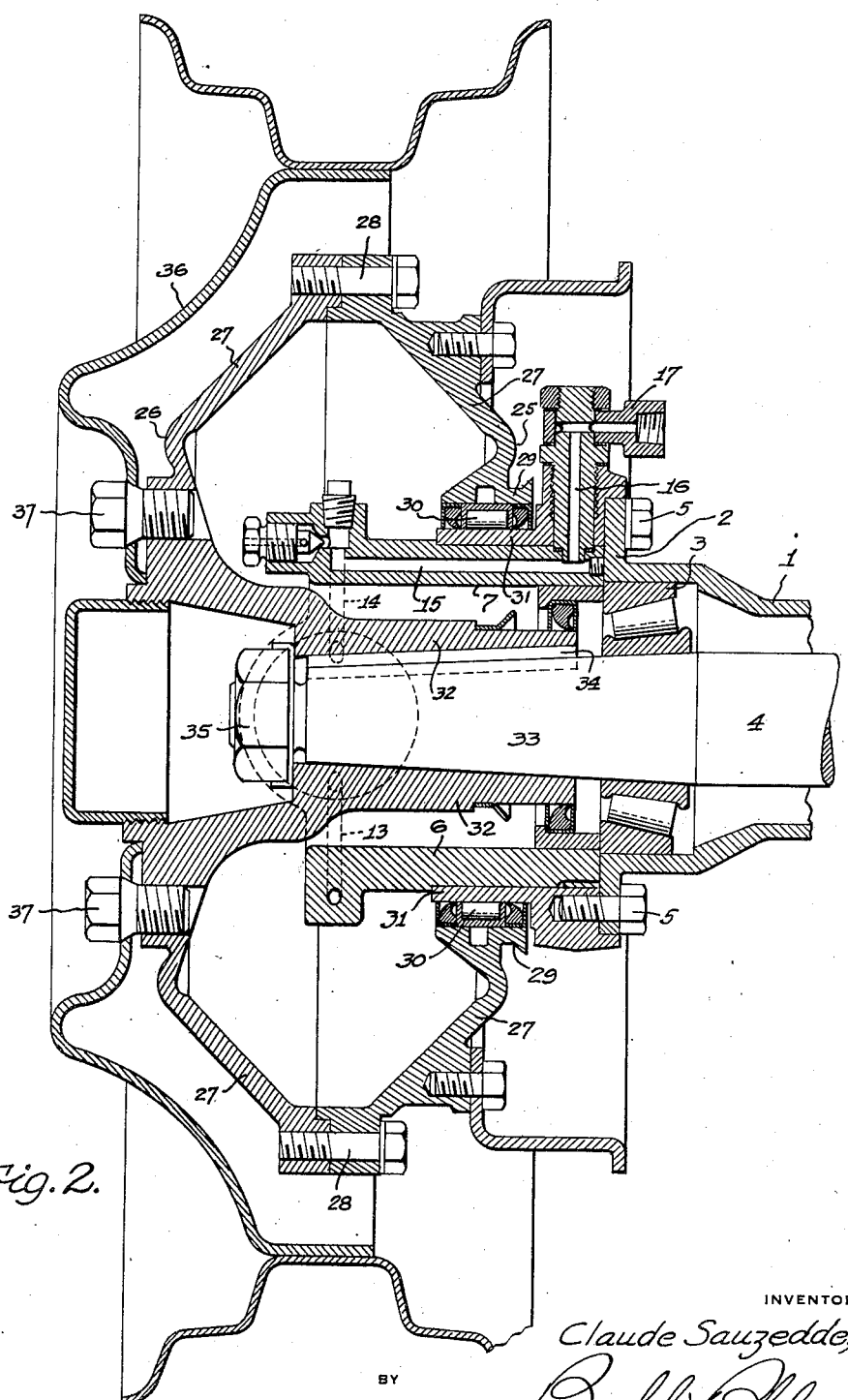
Fig. 2 is a section taken on the line 2—2 of Fig. 1.
Figure 3:
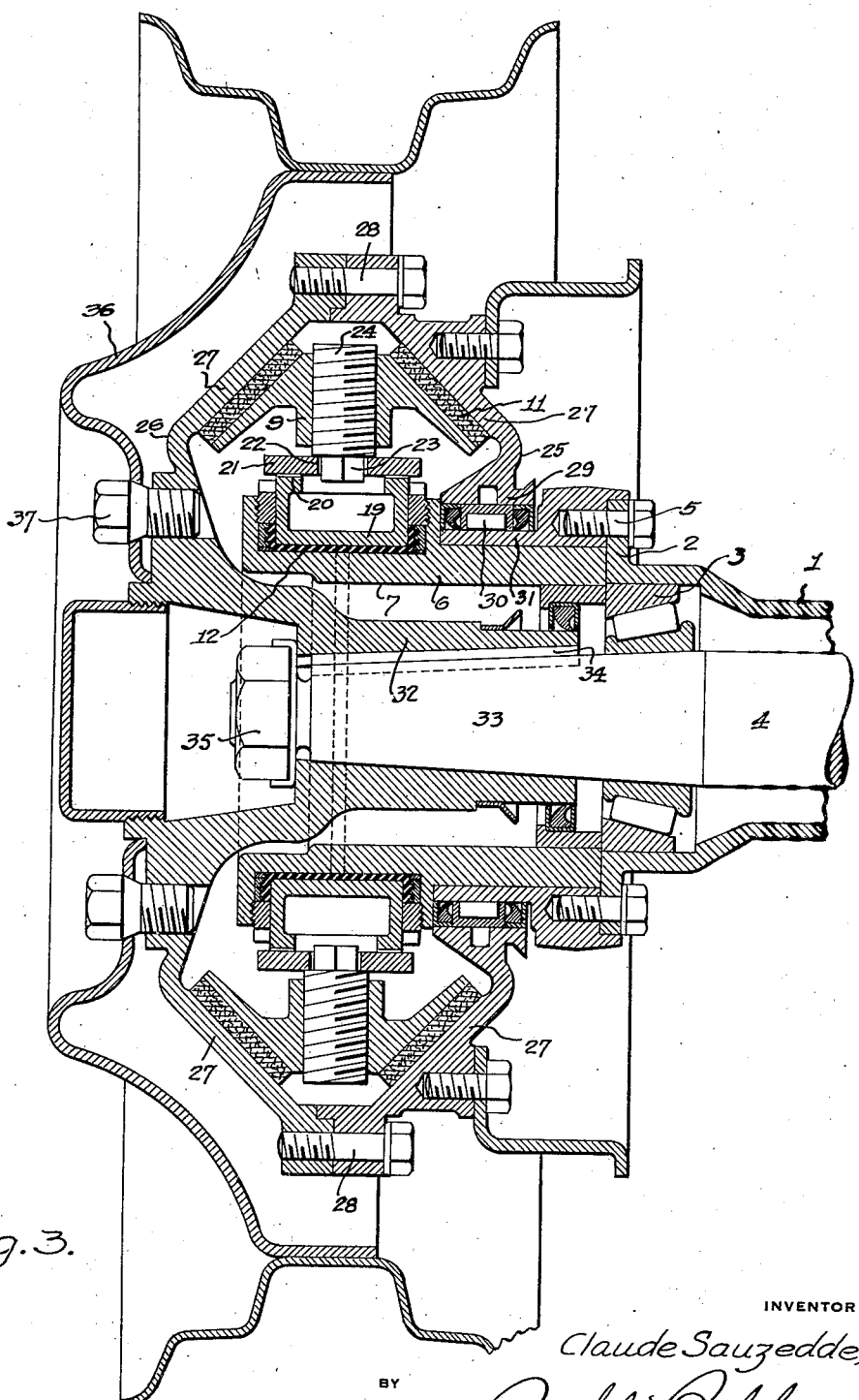
Fig. 3 is a section taken on the line 3—3 of Fig. 1.

In addition, the assembly is such that at least a portion of the vehicle load is carried by the spider and thus by the axle housing, although the wheel itself has a floating characteristic relative to the spider. In the form shown in Figs. 1 to 3, the load is divided between the axle and the spider, while in the Fig. 4 form the load is carried by the housing—the spider being supported from the latter. In both forms the spider is formed with an axial opening having dimensions such as to permit the free passage of the axle, in addition to which the opening receives a portion of the wheel hub within the space between the axle and the spider, with the result that adequate bearing surface is provided for the wheel with the hub zone portion within the spider opening extending across the perpendicular plane referred to so that the arrangement tends to stabilize the wheel against twisting strains set up during service, since such plane corresponds approximately to the median or tread plane of the wheel itself.

Since the brake units are made operative by fluid pressure, rendered active from a remote source, it is apparent that the units themselves should be stable so far as floating action is concerned, to ensure maintenance of proper connections. To enable the needed flexibility to permit wheel floating, the lost-motion effect presented by the connection between member 21 and the squared end 23 enables lateral shifting of the shoes to compensate for floating of the wheel, such shift not affecting the piston operation while permitting the shoes to properly co-operate with the braking surfaces of the wheel hub to ensure maximum braking effort when the fluid pressure is made active.

Although specific embodiments of the invention have been illustrated and described it will be understood that various changes may be made within the scope of the appended claims without departing from the spirit of the invention and such changes are contemplated.

What I claim is:

1. In braking systems of the hydrostatic type, wherein a plurality of braking units are symmetrically disposed relative to the axis of rotation of the wheel to be braked, wherein the wheel hub zone is formed with a pair of spaced annular braking surfaces oppositely inclined relative to a plane extending perpendicularly through such axis of rotation with the wheel hub zone arranged with walls oppositely disposed with respect to such plane to form an enclosure for the braking units, and wherein each braking unit includes a shoe formation providing a pair of faces adapted to concurrently co-operate with the braking surfaces when the shoes are moved outwardly radially of the axis of rotation by fluid pressure rendered active concurrently on the several units from a remote source, the combination with such assembly, of a supporting assemblage for the assembly elements, said assemblage including a live axle having a drive relation with said wheel hub, an axle housing, a non-rotatable spider carried by the axle housing and serving as a support for the braking units, said spider being positioned annular with respect to the axle and crossing said perpendicular plane, said hub zone having its inner wall supported by and rotatable on the spider, said spider having an axial opening for the free passage of the axle with the dimensions of the opening sufficient to permit extension of a hub zone wall thereinto external of the axle and with the extension crossing such perpendicular plane.

2. A system as in claim 1 characterized in that the hub zone extension is carried by and anchored to the live axle within the spider opening, whereby the load will be distributed between the axle and the spider.

3. A system as in claim 1 characterized in that the hub zone extension is carried by and anchored to the live axle within the spider opening with the anchored portion extending on opposite sides of the perpendicular plane through the axis of rotation.

4. A system as in claim 1 characterized in that the hub zone extension leads inwardly from the outer wall of the unit enclosure and is carried by and removably anchored to the live axle within the spider opening.

5. A system as in claim 1 characterized in that the hub zone extension leads inwardly from the outer wall of the unit enclosure and is carried by and anchored to the live axle within the spider opening, said enclosure outer wall forming a support for a demountable rim and body section of the wheel.

6. A system as in claim 1 characterized in that the hub zone extension leads inwardly from the outer wall of the unit enclosure and is carried by and anchored to the live axle within the spider opening, the inner wall of the unit enclosure carrying an external annular emergency brake drum.

7. A system as in claim 1 characterized in that the axle housing carries an annular extension projecting into the spider opening intermediate and spaced from the live axle and the wall of the spider opening and crossing said perpendicular plane, the hub zone extension projecting into the spider opening external of and supported by the axle housing extension, whereby the load distribution is applied to individual axle-housing-carried elements.

8. A system as in claim 1 characterized in that the axle housing carries an annular extension projecting into the spider opening intermediate and spaced from the live axle and the wall of the spider opening and crossing said perpendicular plane, the hub zone extension projecting into the spider opening external of and supported by the axle housing extension, the live axle projecting outwardly beyond the axle-housing extension with such projecting portion having an anchored drive connection with the hub zone.

9. A system as in claim 1 characterized in that the axle housing carries an annular extension projecting into the spider opening intermediate and spaced from the live axle and the wall of the spider opening and crossing said perpendicular plane, the hub zone extension projecting into the spider opening external of and supported by the axle-housing extension, to distribute the load between individual axle-housing-carried elements, the hub zone unit enclosure being sectional with peripheral demountable fastenings, said fastenings being operative to secure the wheel rim demountably to the hub.

10. A system as in claim 1 characterized in that each brake unit includes a lost motion relationship therein active to permit limited floating action of the hub in the direction of the wheel axis and retain uniform braking activity during floatation.

11. A system as in claim 1 characterized in that the supporting relationship between the hub and the spider includes anti-friction means of a type permitting relative movement between hub and spider in the direction of the wheel axis, the braking units each including means whereby the unit braking faces may shift compensatingly with the hub braking surfaces without affecting normal braking activity.

12. A system as in claim 1 characterized in that each braking unit includes a piston movable radially in brake setting direction by fluid pressure, a shoe formation adjustable radially relative to the piston by means permitting manual adjustment, said means being operative to provide a limited lost-motion relationship between shoe formation and piston in the direction of the axis of the wheel, whereby the shoe formation will be self-adjusting relative to the braking surfaces of the hub under any limited floating movements of the hub in such axial direction.

13. A system as in claim 1 characterized in that each braking unit includes a piston movable radially in brake setting direction by fluid pressure and with the piston supported by the spider, a shoe formation adjustable radially relative to the piston by means permitting manual adjustment, said means being operative to provide a limited lost-motion relationship between the shoe formation and piston in the direction of the wheel axis to thereby permit the shoe formation to compensate for any floating of the hub in the direction of the wheel axis, said means serving to limit the extent of the hub floatation, whereby the brake unit is co-operative with the hub to prevent loss of the wheel in event of breakage of the axle.

CLAUDE SAUZEDDE.